Dec. 4, 1923.
W. A. ALLEN
TAPER GAUGE
Filed Dec. 12, 1921
1,476,573
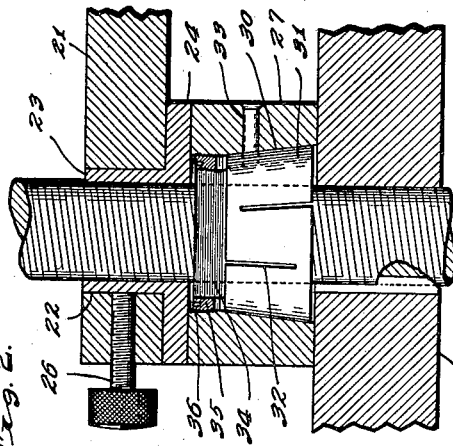
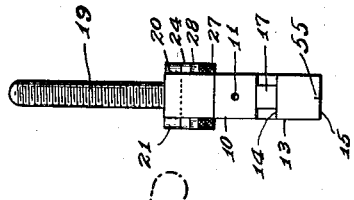
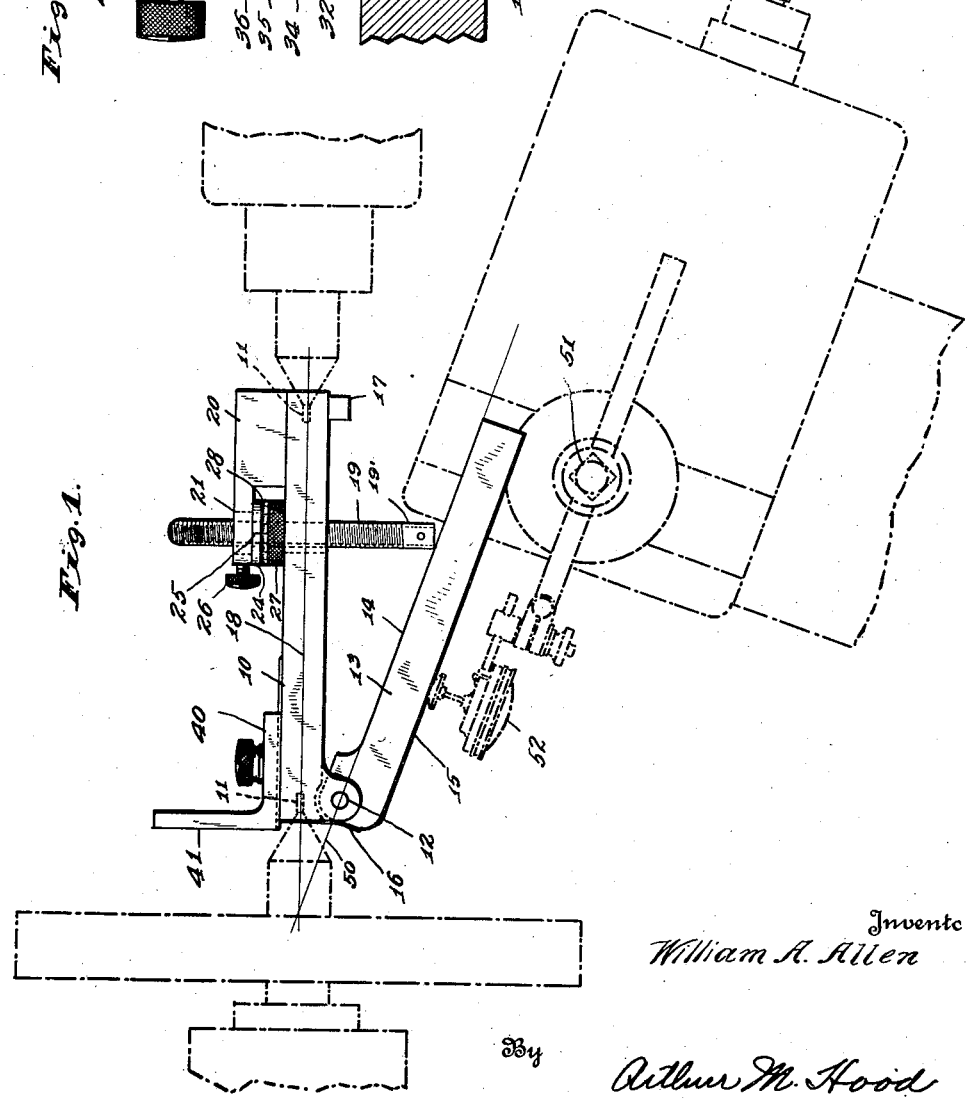
Inventor
William A. Allen
By
Arthur M. Hood
Attorney Patented Dec. 4, 1923.

1,476,573

UNITED STATES PATENT OFFICE.

WILLIAM A. ALLEN, OF INDIANAPOLIS, INDIANA, ASSIGNOR TO WILLIAM A. ALLEN AND HERMAN C. STADTLANDER, BOTH OF INDIANAPOLIS, INDIANA, A COPARTNERSHIP.

TAPER GAUGE.

Application filed December 12, 1921. Serial No. 521,601.

*To all whom it may concern:*

Be it known that I, WILLIAM A. ALLEN, a citizen of the United States, residing at Indianapolis, in the county of Marion and State of Indiana, have invented a new and useful Taper Gauge, of which the following is a specification.

The object of my invention is to produce an efficient instrument by means of which the included angle of an existing or desired taper may be determined and by means of which a cutting tool of a lathe or other similar machine may be quickly and accurately set, in order that a desired taper may be produced.

The accompanying drawings illustrate my invention: Fig. 1 is a plan of my improved instrument, the head stock, tail stock, and tool rest of a lathe being shown in dotted lines; Fig. 2 a fragmentary section, on an enlarged scale, of the adjusting nut and adjacent parts, and Fig. 3 an end elevation as seen from the right of Fig. 1, the indicator or gauge bar being closed.

In the drawings 10 indicates the main body of the instrument provided at its opposite ends with alined centers 11. Pivoted at 12 upon the main body is an indicator or gauge bar 13 having parallel faces 14 and 15, the face 14 being preferably radial to the axis 12. A light spring 16 serves to urge bar 13 to a zero position against a stop 17 at which time the surface 14 will be parallel with the axis 18 of the main body 10.

Splined in body 10, at right angles to axis 18, is a threaded spacer 19, the end 19' of which is accurately squared and preferably hardened. Secured to body 10 is a block 20 provided with a finger 21 lying parallel with the body 10 provided with a perforation 22 in which is journaled a sleeve 23 having an annular flange 24 which bears a setting mark 25. Sleeve 23 may be held in any desired position of angular adjustment in perforation 22 by a clamping screw 26.

Lying between body 10 and flange 24 is an adjusting nut 27 which is provided with a circumferential decimal series of indicating marks 28. The nut 27 may be directly threaded upon screw 19, if desired, but, in order that wear may be readily taken up I provide the nut with a conical seat 30 in which is mounted a nut 31 having a conical exterior and having its body longitudinally slotted at various points as indicated at 32 so that the internal diameter of the nut may be slightly varied.

In order to accomplish the adjustment of the nut 31 it is splined in the body 27 by means of a finger 33 and is provided with a threaded extension 34 engaged by the internal threads of an adjusting ring 35 which is threaded externally into the threads 36 in member 27, the threads 34 and 36 being of different pitch.

The number of threads per inch on screw 19, the number of graduations in scale 28, and the distance between axis 12 and the line of the point of contact of the end of the screw 19 with surface 14, measured as the shortest distance between axis 12 and a line parallel with the axis of the screw 19, should preferably be so proportioned that movement of the adjusting nut through one division of scale 28 will shift screw 19 through a unit distance expressed in decimals.

The face 15 of indicator or gauge bar 13 is provided with a well defined indicator line 55 which is so placed as to be at all times in the plane of the axis 18.

The instrument may be used in a number of ways. Assuming that a workman has been instructed to turn a taper having a definite included angle. He will turn to a table of tangents; find the value of the tangent of half the included angle; and then shift the nut 27 through an angular distance which, by a reading of the scale 28 corresponding to the value of the tangent, will project said screw from the zero position to the desired extent. This will place the surface 15 parallel with line 50 which will at that time lie at an angle to axis 18 equal to half the desired included angle. The operator will then, by means of a surface gauge, bring line 55 up into the horizontal plane of the axis 18 and hold the same in that position while shifting the tool post 51 so as to slide a gauge 52 along the surface 15 to determine whether or not the tool rest has been set at a proper angle, corresponding with the setting of the surface 15.

If a workman has been called upon to produce a taper adding a given taper per inch it is evident that one half of this amount will correspond to the tangent of half the included angle and he will obtain a proper setting of indicator or gauge bar 13 by direct reading of scale 28.

If the work required is defined as a conical frustum of given end diameters and lengths it is apparent that the difference between the half diameter of the larger end and the half diameter of the smaller end, divided by the length, will be the direct reading on the scale 28, or taper per inch.

If taper per foot is given or taper per inch, the desired reading of the instrument will be defined by the simple operation of division. All of the above is based upon the assumption that the parts are so proportioned that the reading of scale 28 corresponds to taper per inch.

Of course, while that is probably the most convenient proportionate parts, a departure from this proportioning, in order that the scale 28 may give the reading in different terms, will not depart from the spirit of my invention.

Many other illustrations of the manner of use of the instrument might be given but they will be readily apparent to workmen who are reasonably skilled.

By supporting the instrument on surface 41 of foot 40 existing tapers may be gauged without utilizing the centers 11—11.

I claim as my invention:

1. An angle gauge comprising a main body having alined centers in its opposite ends, a gauge bar pivoted upon the main body, a spacer member carried by the main body at right angles to the zero position of the gauge bar, and means by which said spacer member may be accurately positioned at different amounts of projection from the zero position.

2. An angle gauge comprising a main body having means for properly positioning the same for gaging purposes, a gauge bar pivoted upon the main body and having one face thereof forming a gauging surface, a spacer member carried by the main body at right angles to the zero position of the gauge bar, and means by which said spacer member may be accurately positioned at different amounts of projection from the zero position.

3. An angle gauge comprising a main body having alined centers in its opposite ends, a gauge bar pivoted upon the main body, a threaded spacer member in said gauge bar and in the plane of movement of the gauge bar and at right angles to the zero position of said gauge bar, a nut having a threaded engagement with said spacer and journaled on the main body, and an indicator scale carried by said nut to indicate its angular position and thereby indicate the amount of projection of the spacer member from zero position.

4. An angle gauge comprising a main body having alined centers in its opposite ends, a gauge bar pivoted upon the main body, a threaded spacer member in said gauge bar and in the plane of movement of the gauge bar and at right angles to the zero position of said gauge bar, a nut having a threaded engagement with said spacer and journaled on the main body, and an indicator scale carried by said nut to indicate its angular position and thereby indicate the amount of projection of the spacer member from zero position, said nut comprising an axially adjustable threaded element and a body in which said element is mounted.

In witness whereof, I have hereunto set my hand at Indianapolis, Indiana, this 8th day of December, A. D. one thousand nine hundred and twenty-one.

WILLIAM A. ALLEN.